United States Patent

Shippy

[11] Patent Number: 6,003,125
[45] Date of Patent: Dec. 14, 1999

[54] HIGH PERFORMANCE ADDER FOR MULTIPLE PARALLEL ADD OPERATIONS

[75] Inventor: David Shippy, Bellaire, Tex.

[73] Assignee: Texas Instruments Incorporated, Dallas, Tex.

[21] Appl. No.: 09/012,381

[22] Filed: Jan. 23, 1998

Related U.S. Application Data

[60] Provisional application No. 60/036,393, Jan. 24, 1997.

[51] Int. Cl.[6] .................................. G06F 7/42; G06F 7/44
[52] U.S. Cl. ........................... 712/210; 712/42; 708/518; 708/709
[58] Field of Search ....................... 708/518, 682, 708/685, 706, 709, 708, 707; 712/210, 215, 42, 36

[56] References Cited

U.S. PATENT DOCUMENTS

| | | | |
|---|---|---|---|
| 3,987,291 | 10/1976 | Gooding et al. | 708/711 |
| 4,707,800 | 11/1987 | Montrone et al. | 708/714 |
| 4,914,617 | 4/1990 | Putrino et al. | 708/706 |
| 5,189,636 | 2/1993 | Patti et al. | 708/706 |
| 5,636,351 | 6/1997 | Lee | 712/204 |
| 5,841,379 | 11/1998 | Seshan et al. | 341/63 |
| 5,883,824 | 3/1999 | Lee et al. | 708/518 |

*Primary Examiner*—Larry D. Donaghue
*Attorney, Agent, or Firm*—J. Dennis Moore; Wade James Brady, III; Richard L. Donaldson

[57] ABSTRACT

An adder unit for a microprocessor, being capable, in response to a first control signal, of adding two full word data values, stored in a first storage location and in a second storage location, respectively, and being capable, in response to a second control signal, of adding in parallel four half word data values, a first half word data value and a second half word data value being stored in the first storage location at the low half and the high half thereof, respectively, and a third half word data value and a fourth half word data value being stored in the second storage location at the low half and the high half thereof, respectively. The adder unit includes a first half word adder, arranged so as to add the first half word and the third half word to provide a first sum output of the adder unit, and a first carry out signal. The adder unit also includes a second half word adder arranged so as to add the second half word and the fourth half word, with a carry-in of 0 to provide a second sum output. The adder unit also includes a third half word adder arranged so as to add the second half word and the fourth half word, with a carry-in of 1 to provide a third sum output. Finally, the adder unit includes logic responsive to the first and the second control signals such that when the first control signal is present and the first carry-out signal is a 0, the logic provides the second sum output as a second sum output of the adder, to be concatenated with the first sum output of the adder, but, when the first control signal is present and the first carry-out signal is a 1, the logic provides the third sum output as a second sum output of the adder, to be concatonated with the first sum output of the adder. On the othe hand, when the second control signal is present, the logic provides the second sum output as a second sum output of the adder.

2 Claims, 1 Drawing Sheet

HIGH PERFORMANCE ADDER FOR MULTIPLE PARALLEL ADD OPERATIONS

This application is a continuation of Provisional application No. 60/036,393 filed Jan. 24, 1997.

TECHNICAL FIELD OF THE INVENTION

This invention relates to microprocessors, and more particularly relates to adder units within microprocessors.

BACKGROUND OF THE INVENTION

Microprocessors, which include digital signal processors ("DSPs"), include execution units that perform the various operations directed by the instructions that make up the programs running on the microprocessors. The adder is one such execution unit, that performs addition operations. For example, a typical contemporary microprocessor adder performs two thirty-two bit additions. Thus, thirty-two bit wide operands, i.e., full word operands, are provided as inputs, and a full word sum result is provided as an output. The inputs are provided from registers in a register file, and the result is also provided to a register in the register file.

FIG. 1 depicts a typical full word addition, or ADD, operation, where the operands x and y, stored in registers r1 and r2, respectively, are added, and the result, z, is stored in register r3. This is expressed by, ADD r1, r2, r3

While full word ADDs are essential in such microprocessors, another important microprocessor computation, especially in DSP applications, is the performance of multiple sub-word ADDs. Unfortunately, such ADD operations, for example of two sixteen bit, or half word, operands, are typically performed using full word adders that use carry-lookahead (CLA) schemes to compute the addition. One problem with this is that it breaks the carry path, and thus slows down the overall ADD operation.

Therefore, it would be desirable to provide an adder for inclusion in a microprocessor, which efficiently performs multiple sub-word ADD operations, without a great deal of additional circuitry, as compared with prior art adders. The present invention provides such an adder.

SUMMARY OF THE INVENTION

The present invention provides an adder unit for a microprocessor, being capable, in response to a first control signal, of adding two full word data values, stored in a first storage location and in a second storage location, respectively, and being capable, in response to a second control signal, of adding in parallel four half word data values, a first half word data value and a second half word data value being stored in the first storage location at the low half and the high half thereof, respectively, and a third half word data value and a fourth half word data value being stored in the second storage location at the low half and the high half thereof, respectively. The adder unit includes a first half word adder, arranged so as to add the first half word and the third half word to provide a first sum output of the adder unit, and a first carry out signal. The adder unit also includes a second half word adder arranged so as to add the second half word and the fourth half word, with a carry-in of 0 to provide a second sum output. The adder unit also includes a third half word adder arranged so as to add the second half word and the fourth half word, with a carry-in of 1 to provide a third sum output. Finally, the adder unit includes logic responsive to the first and the second control signals such that when the first control signal is present and the first carry-out signal is a 0, the logic provides the second sum output as a second sum output of the adder, to be concatonated with the first sum output of the adder, but, when the first control signal is present and the first carry-out signal is a 1, the logic provides the third sum output as a second sum output of the adder, to be concatonated with the first sum output of the adder. On the othe hand, when the second control signal is present, the logic provides the second sum output as a second sum output of the adder.

These and other features of the invention that will be apparent to those skilled in the art from the following detailed description of the invention, taken together with the accompanying drawings.

DETAILED DESCRIPTION OF THE PREFERRED EMBODIMENT

The preferred embodiment of the present invention implements multiple parallel sub-word ADD operations and single word ADD operations with no speed degradation, i.e., fully utilizing the power of a thirty-two bit adder. Two sub-word additions are performed in parallel in the same adder unit, effectively doubling the rate of sub-word additions.

Figure 1:
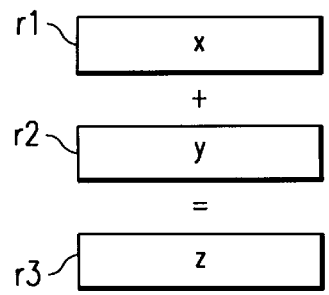
FIG. 1 is a block diagram showing a conventional full word ADD operation.
Figure 2:
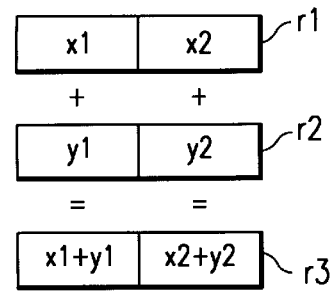
FIG. 2 is a block diagram showing a half-word ADD operation.

FIG. 2 depicts a half word add operation where the operands x1 and x2 are stored in the upper and lower half, respectively, of register r1, the operands y1 and y2 are stored in the upper and lower half, respectively, of register r2. The results of the addition operations, x1+y1 and x2+y2, are stored in the upper and lower half, respectively, of register r3. In this case, the additions x1+y2 and y1+y2 are performed in parallel, and the results are stored in parallel, as well. This addition is performed in execution of the same instruction as that described above, namely ADD r1, r2, r3 with the proviso that the carry-in to the upper half addition must be 0, regardless of the result of the lower half addition, as they are independent additions.

Figure 3:
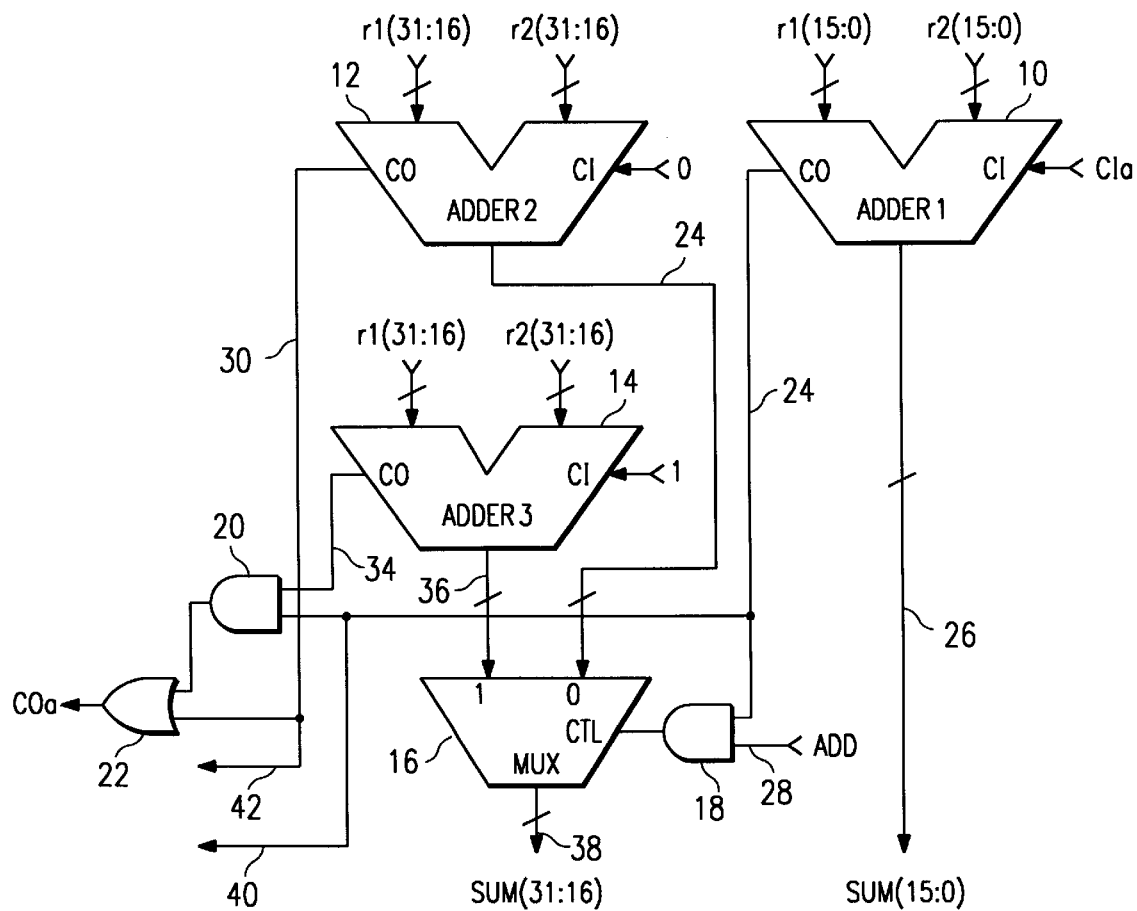
FIG. 3 is a logic diagram showing the preferred embodiment of the present invention.

FIG. 3 is a logic diagram showing an adder unit according to the preferred embodiment of the present invention, in which both full word ADD and half-word ADD operations can be performed, without speed degradation. The adder unit includes a first adder 10, a second adder 12 and a third adder 14. Adders 10, 12 and 14 are all conventional thirty-two bit adders. Also included are a multiplexer (MUX) 16, a first AND gate 18, a second AND gate 20 and an OR gate 22.

The sixteen least significant bits (LSBs) of the contents of register r1 (FIG. 2), r1(15:0), are provided as a first input to adder 10, while the sixteen LSBs of r2, r2(15:0), are provided as a second input to adder 10. Adder 10 has a conventional carry in port, CI, for receiving a carry-in signal for the adder unit, CIa, as shown, and a conventional carry-out port, CO, for providing a carry-out signal from an ADD operation performed in adder 10. The CO output is provided to line 24, which is connected to one input of AND gate 18 and to one input of AND gate 20. Adder 10 computes the addition of the inputs to arrive at their sum, SUM(15:0), provided on line 26.

The other input to AND gate 18 is a signal line 28 that is active, e.g. high, if a normal ADD operation is to be performed. If a normal ADD operation is not to be performed, i.e., if multiple parallel half-word addition is to be performed, then signal line 28 is inactive.

The sixteen most significant bits (MSBs) of the contents of register r1 (FIG. 2), r1(31:16), are provided as a first input to adder 12, while the sixteen MSBs of r2, r2(31:16), are provided as a second input to adder 12. Adder 12 has a conventional carry in port, CI, for receiving a carry-in signal, as shown, and a conventional carry-out port, CO, for providing a carry-out signal from an ADD operation performed in adder 12. Note, however, that the carry-in port of adder 12 is tied to 0. The CO output is provided to line 30. Line 30 is connected to one input of OR gate 22. Adder 12 computes the addition of the inputs, with a carry-in of 0, to arrive at their (carry-in of 0) sum, which is provided as an output of adder 12, provided on line 32.

Likewise, r1(31:16), are provided as a first input to adder 14, while r2(31:16), are provided as a second input to adder 14. Adder 14 has a conventional carry in port, CI, for receiving a carry-in signal, as shown, and a conventional carry-out port, CO, for providing a carry-out signal from an ADD operation performed in adder 14. Note, however, that the carry-in port of adder 14 is tied to 1. The CO output is provided to line 34. Line 34 is connected to the other input of AND gate 20. The output of AND gate 20 is connected to the other input of OR gate 22. The output of OR gate 22 is the carry-out signal, COa, for the adder unit. Adder 14 computes the addition of the inputs, with a carry-in of 1, to arrive at their (carry-in of 1) sum, which is provided as an output of adder 14, provided on line 36.

Line 32 is connected to the select-0 input of MUX 16. Line 36 is connected to the select-1 input of MUX 16. The select-0 input of MUX 16 is provided as an output of MUX 16, on line 38, when a signal level 0 is provided at the control input CTL of MUX 16. The select-1 input of MUX 16 is provided as an output of MUX 16, on line 38, when a signal level 1 is provided at the control input CTL of MUX 16. The output of AND gate 18 is connected to the CTL input of MUX 16.

The adder unit of FIG. 3 operates as follows. Adder 10 receives the adder unit carry-in signal, CIa, and computes the sum SUM(15:0) from the addition of the LSBs:

$$r1(15:0)+r2(15:0)=SUM(15:0)$$

which is provided as an output on line 26. A carry-out signal for the addition operation performed in adder 10 is provided on line 24.

Simultaneously, adder 12 computes the sum, based on a fixed carry-in of 0, from the addition of the MSBs, which sum is provided on line 32:

$$[r1(31:16)+r2(31:16)]_{CI=0}=SUM(31:16)_{CI=0}$$

while adder 14 computes the sum, based on a fixed carry-in of 1, from the addition of the MSBs, which sum is provided on line 36:

$$[r1(31:16)+r2(31:16)]_{CI=1}=SUM(31:16)_{CI=1}$$

Now, if a normal ADD operation is to be performed, line 28 is active. Thus, the carry-out signal of adder 10, on line 24, is effectively provided through AND gate 18 to the control input of MUX 16. Therefore, if the carry-out signal of adder 10 is a 0, then SUM(31:16)$_{CI=0}$ on line 32 is selected, to be concatenated with SUM(15:0) to provide the complete result of the normal addition operation. Likewise, if the carry-out signal of adder 10 is a 1, then SUM(31:16)$_{CI=1}$ on line 36 is selected, to be concatenated with SUM (15:0) to provide the complete result of the normal addition operation.

The proper carry-out signal for the unit, COa, is provided at the output of OR gate 22 as follows. If the carry-out signal of adder 10 is a 0, then the carry-out signal of adder 12 is the correct carry-out signal for the unit. The signal on line 24 maintains the output of AND gate 20 as a 0. Line 30, bearing the carry-out signal of adder 12, is thus effectively passed through OR gate 22 to provide the correct carry-out signal for the unit.

On the other hand, if the carry-out signal of adder 10 is a 1, then the carry-out signal of adder 14 is the correct carry-out signal for the unit. The signal on line 24, being a 1, enables the signal on line 34, bearing the carry-out signal of adder 14, to be effectively passed through AND gate 20 and through OR gate 22 to provide the correct carry-out signal for the unit. Note that, while the carry-out output of adder 12 is also provided to an input of OR gate 22, if the carry-out signal of adder 10 is a 1 then, if the carry-out of adder 14 is a 0, which causes the output of AND gate 20 to be a 0, then the carry-out signal of adder 12 will always be a 0 as well, since adder 12 performs the same addition as that performed in adder 14, but with a carry-in of 0, instead of 1.

On the other hand, if a parallel half-word addition is to be performed, line 28 is inactive. This controls MUX 16 to select the value on line 32 to provide as an output on line 38. Thus, the addition result with a carry-in of 0 for the sixteen MSBs, SUM(31:16)$_{CI=0}$, is always selected. In this operation, the carry-in signal for the unit, CIa, will always be a 0, as well.

Note that the carry-outs of adder 10 and of adder 12 are available as outputs 40 and 42, respectively. Their availability as outputs may or may not be necessary in a given microprocessor architecture.

Although the present invention and its advantages have been described in detail, it should be understood that various changes, substitutions and alterations can be made herein without departing from the spirit and scope of the invention as defined by the appended claims. For example, while the preferred embodiment described above involves the use of thirty-two bit adders, the size of the adders is simply a matter of design choice. In that connection, the term "word", as used herein, can be understood to mean the largest size of the values that can be added by the adder, whatever that size may be.

Also, additions of values smaller than half word can be accomplished by the application of the principles of the present invention. For example, quarter-word additions can be performed, by appropriate modification of the logic shown in FIG. 3. The SUM outputs in a configuration for quarter-word additions could be provided by having four stages of half-word adders, and correspondingly more MUXes. The carryout of the highest order adder having a forced carry-in of 1 could be ANDed with the carry-out of the next to highest order adder, and OR the result of that ADD with the carry-out of the highest order adder having a forced carry-in of 0.

These, and all other modifications, variations and embodiments as are encompassed by the metes and bounds of the claims set forth hereinbelow are included in the present invention.

What is claimed is:

1. An adder unit for a microprocessor, being capable, in response to a first control signal, of adding two full word data values, stored in a first storage location and in a second storage location, respectively, and being capable, in response to a second control signal, of adding in parallel four half word data values, a first half word data value and a second half word data value being stored in said first storage location at the low half and the high half thereof, respectively, and a third half word data value and a fourth half word data value being stored in said second storage location at the low half and the high half thereof, respectively, comprising:

- a first half word adder, arranged so as to add said first half word and said third half word to provide a first sum output of said adder unit, and a first carry out signal;
- a second half word adder arranged so as to add said second half word and said fourth half word, with a carry-in of 0 to provide a second sum output;
- a third half word adder arranged so as to add said second half word and said fourth half word, with a carry-in of 1 to provide a third sum output; and
- logic responsive to said first and said second control signals such that when said first control signal is present,
    - and said first carry-out signal is a 0, said logic provides said second sum output as a second sum output of said adder, to be concatonated with said first sum output of said adder,
    - and said first carry-out signal is a 1, said logic provides said third sum output as a second sum output of said adder, to be concatonated with said first sum output of said adder, and
    - such that when said second control signal is present, providing said second sum output as a second sum output of said adder.

2. An adder unit for a microprocessor, capable of full word ADD operations, and capable of multiple half-word ADD operations, providing a first half word sum output and a second half word sum output, comprising:

- a first adder, capable of adding a first half word operand from a first storage location and a second half word operand from a second storage location, providing a first carry-out signal from an ADD operation, and providing the result of an ADD operation as said first half word sum output;
- a second adder, being provided with a carry-in signal of 0 and capable of adding a third half word operand from a third storage location and a fourth half word operand from a fourth storage location, providing a second carry-out signal from an ADD operation, and providing a second sum result output;
- a third adder, being provided with a carry-in signal of 1 and capable of adding a third half word operand and a fourth half word operand, providing a third carry-out signal from an ADD operation, and providing a third sum result output;
- a multiplexer, having as a first input said second sum result output and having as a second input said third sum result output, capable of selecting said first input or said second input to apply as an output thereof, which is said second half word sum output; and
- logic circuitry, receiving a control signal indicating, alternatively, that two half word ADD operations are to be performed, or, that a full word ADD operation is to be performed, and,
- if said control signal indicates that two half word ADD operations are to be performed, controlling said multiplexer to select said first multiplexer input to provide as said second half word sum output, and
- if said control signal indicates that a full word ADD operation is to be performed,
    - if said first carry-out signal is a 0, controlling said multiplexer to select said first multiplexer input to provide as said second half word sum output, and provide said second carry-out signal as the carry-out signal for said full word ADD operation, and
    - if said first carry-out signal is a 1, controlling said multiplexer to select said second multiplexer input to provide as said second half word sum output, and provide said third carry-out signal as the carry-out signal for said full word ADD operation.

* * * * *